US008769243B2

(12) United States Patent
Chang et al.

(10) Patent No.: US 8,769,243 B2
(45) Date of Patent: Jul. 1, 2014

(54) APPARATUS WITH SMART CARD CHIP FOR STORING COMMUNICATION FILE IN NON-VOLATILE MEMORY

(75) Inventors: Ching-Wen Chang, Hsinchu (TW); Huan-Sheng Li, Miaoli County (TW)

(73) Assignee: Phison Electronics Corp., Miaoli (TW)

( * ) Notice: Subject to any disclaimer, the term of this patent is extended or adjusted under 35 U.S.C. 154(b) by 170 days.

(21) Appl. No.: 13/426,620

(22) Filed: Mar. 22, 2012

(65) Prior Publication Data
US 2013/0179626 A1 Jul. 11, 2013

(30) Foreign Application Priority Data
Jan. 6, 2012 (TW) .............................. 101100646 A

(51) Int. Cl.
G06F 12/02 (2006.01)
G06F 12/10 (2006.01)
(52) U.S. Cl.
CPC ........ G06F 12/0246 (2013.01); G06F 12/1009 (2013.01)
USPC .................... 711/207; 711/103; 711/E12.008
(58) Field of Classification Search
CPC ............ G06F 12/0246; G06F 12/0292; G06F 12/1009; G06F 2212/7201
USPC ................................... 711/103, 207, E12.008
See application file for complete search history.

(56) References Cited

U.S. PATENT DOCUMENTS

| 7,917,697 | B2 * | 3/2011 | McAvoy et al. | 711/115 |
| 2005/0044330 | A1 * | 2/2005 | Elazar et al. | 711/154 |
| 2005/0080985 | A1 * | 4/2005 | Sasaki | 711/103 |
| 2006/0107009 | A1 * | 5/2006 | Ooshima et al. | 711/163 |
| 2006/0129749 | A1 * | 6/2006 | Nakanishi et al. | 711/103 |
| 2006/0282644 | A1 * | 12/2006 | Wong | 711/206 |
| 2008/0082774 | A1 * | 4/2008 | Tomlin et al. | 711/170 |
| 2008/0235486 | A1 * | 9/2008 | Sepulveda | 711/206 |
| 2009/0187709 | A1 * | 7/2009 | Chen et al. | 711/115 |
| 2010/0023721 | A1 * | 1/2010 | Ito | 711/166 |
| 2010/0205373 | A1 * | 8/2010 | He et al. | 711/115 |
| 2010/0241789 | A1 * | 9/2010 | Chu et al. | 711/103 |
| 2011/0022746 | A1 * | 1/2011 | Chang | 710/52 |
| 2011/0320692 | A1 * | 12/2011 | Maeda et al. | 711/103 |

\* cited by examiner

*Primary Examiner* — Hal Schnee
(74) *Attorney, Agent, or Firm* — Jianq Chyun IP Office

(57) ABSTRACT

A data processing method for a memory storage apparatus having physical blocks is provided. The method includes: grouping the physical blocks into a data area, a spare area and a system area; configuring a plurality of logical addresses which would be formatted into a file allocation table area having cluster entry fields, a root directory area having directory entry fields and a file area having clusters; storing a communication file from the $K^{th}$ cluster of the file area; recording a file description block corresponding to the communication file in the $M^{th}$ directory entry field and storing an end of cluster chain mark in the cluster entry field corresponding to the last cluster of the clusters where the communication file stores, and K and M are positive integers which are larger than one. Accordingly, the method can prevent the communication file from being overwritten after the memory storage apparatus is formatted.

15 Claims, 13 Drawing Sheets

APPARATUS WITH SMART CARD CHIP FOR STORING COMMUNICATION FILE IN NON-VOLATILE MEMORY

CROSS-REFERENCE TO RELATED APPLICATION

This application claims the priority benefit of Taiwan application serial no. 101100646, filed on Jan. 6, 2012. The entirety of the above-mentioned patent application is hereby incorporated by reference herein and made a part of this specification.

BACKGROUND

1. Technology Field

The present invention relates to a data processing method of a memory storage apparatus. Particularly, the present invention relates to a data processing method capable of preventing a pre-stored file from being overwritten after a memory storage apparatus is formatted, and a memory controller and a memory storage apparatus using the same.

2. Description of Related Art

Digital cameras, cell phones, and MP3 players have undergone rapid growth in recent years, so that consumer demands for storage media have also rapidly increased. Since a rewritable non-volatile memory (for example, a flash memory) has characteristics such as data non-volatility, low power consumption, small volume, and non-mechanical structure, etc., it is suitable for various aforementioned potable multimedia devices.

Particularly, as electronic wallets and pre-payments are gradually accepted by users, smart cards are widely used. The smart card is an integrated circuit chip (IC chip) having components such as a microprocessor, a card operating system, a security module and a memory etc. for performing a predetermined operation. The smart card provides functions of calculation, encryption, two-way communication and security, so that besides data storage, the smart card may provide a protection for the data stored therein. A subscriber identification module (SIM) card utilized in a cell phone applying a global system for mobile communication (GSM) is an application example of the smart card. However, since storage volumes of the smart cards are limited, memory cards with large volume are combined to the smart cards recently for increasing the storage volumes of the smart cards.

In a memory storage apparatus having a smart card chip, in order to implement command and data transmission between the smart card chip and a host system, according to an existing technique, a memory controller of the memory storage apparatus pre-stores a communication file in a rewritable non-volatile memory combined to the smart card in the memory storage apparatus, and uses the communication file as a communication interface between the smart card and the host system. In detail, each time when the memory storage apparatus is formatted to generate a partition, the memory controller of the memory storage apparatus stores a communication file in the partition, and records information of the communication file in a file system. Then, when an application program of the host system is to transmit a command to the smart card chip of the memory storage apparatus, the application program transmits a write command that indicates writing data to a logical address used for storing the communication file to the memory storage apparatus. Particularly, the memory controller identifies a data stream in the write command to be belonged to the smart card chip according to the logical address in the write command, and transmits the data stream to the smart card chip.

However, after the memory storage apparatus is formatted, when the host system executes a writing operation before rereading the information of the file system of the memory storage apparatus, since the file system information temporarily stored in a buffer memory of the host system does not include the information of the communication file, the host system probably writes data to an address used for storing the communication file, which may cause overwriting of the communication file. Therefore, it is an important issue under development to avoid overwriting the communication file after the memory storage apparatus is formatted and before the host system rereading the information of the file system of the memory storage apparatus.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

The present invention is directed to a memory storage apparatus, a memory controller and a data processing method, which are capable of preventing a pre-stored file from being overwritten after the memory storage apparatus is formatted.

An exemplary embodiment of the invention provides a data processing method for a memory storage apparatus having a rewritable non-volatile memory module and a smart card chip, wherein the non-volatile memory module has a plurality of physical blocks. The data processing method includes grouping the physical blocks into at least a data area, a spare area and a system area, configuring a plurality of logical addresses and mapping the logical addresses to the physical blocks of the data area, wherein the logical addresses are formatted into a file allocation table area, a root directory area and a file area, the file allocation table area has a plurality of cluster entry fields, the root directory area has a plurality of directory entry fields, and the file area has a plurality of clusters. The data processing method also includes storing a communication file in at least one cluster among the clusters of the file area, wherein a start cluster of the at least one cluster is a $K^{th}$ cluster, and K is a positive integer and is greater than 1 and smaller than the number of the clusters of the file area. The data processing method still includes recording a file description block (FDB) corresponding to the communication file in an $M^{th}$ directory entry field in the directory entry fields of the root directory area, wherein M is a positive integer and is greater than 1 and smaller than the number of the directory entry fields. The data processing method further includes storing an end of cluster chain (EOC) mark in a cluster entry field in the file allocation table area corresponding to the last cluster of the at least one cluster.

According to another aspect, an exemplary embodiment of the invention provides a memory controller for a memory storage apparatus having a rewritable non-volatile memory module and a smart card chip. The memory controller includes a host interface, a memory interface and a memory management circuit. The host interface is coupled to a host system. The memory interface is coupled to the rewritable non-volatile memory module, and the rewritable non-volatile memory module has a plurality of physical blocks. The memory management circuit is coupled to the host interface and the memory interface, and groups the physical blocks into at least a data area, a spare area and a system area. The memory management circuit configures a plurality of logical addresses and maps the logical addresses to the physical blocks of the data area, wherein the logical addresses are formatted into a file allocation table area, a root directory area and a file area by the host system, and the file allocation table area has a plurality of cluster entry fields, the root directory area has a plurality of directory entry fields, and the file area has a plurality of clusters. The memory management circuit stores a communication file in at least one cluster among the clusters of the file area, wherein a start cluster of the at least one cluster is a $K^{th}$ cluster, and K is a positive integer and is greater than 1 and smaller than the number of the clusters of the file area. The memory management circuit records a file description block (FDB) corresponding to the communication file in an $M^{th}$ directory entry field in the directory entry fields of the root directory area, wherein M is a positive integer and is greater than 1 and smaller than the number of the directory entry fields. The memory management circuit stores an end of cluster chain (EOC) mark in a cluster entry field in the file allocation table area corresponding to the last cluster of the at least one cluster.

According to another aspect, an exemplary embodiment of the invention provides a memory storage apparatus including a connector, a rewritable non-volatile memory module, a smart card chip and a memory controller. The connector is coupled to a host system. The memory controller is coupled to the connector, the rewritable non-volatile memory module and the smart card chip, and groups the physical blocks into at least a data area, a spare area and a system area. The memory controller configures a plurality of logical addresses and maps the logical addresses to the physical blocks of the data area, wherein the logical addresses are formatted into a file allocation table area, a root directory area and a file area by the host system, and the file allocation table area has a plurality of cluster entry fields, the root directory area has a plurality of directory entry fields, and the file area has a plurality of clusters. The memory controller stores a communication file in at least one cluster among the clusters of the file area, wherein a start cluster of the at least one cluster is a $K^{th}$ cluster, and K is a positive integer and is greater than 1 and smaller than the number of the clusters of the file area. The memory controller records a file description block (FDB) corresponding to the communication file in an $M^{th}$ directory entry field in the directory entry fields of the root directory area, wherein M is a positive integer and is greater than 1 and smaller than the number of the directory entry fields. The memory controller stores an end of cluster chain (EOC) mark in a cluster entry field in the file allocation table area corresponding to the last cluster of the at least one cluster.

According to the above descriptions, in the data processing method, the memory controller and the memory storage apparatus of the exemplary embodiments of the invention, after the memory storage apparatus is formatted, the communication file is stored from the $K^{th}$ cluster of the file area, and the FDB corresponding to the communication file is recorded in the $M^{th}$ directory entry field of the root directory area, wherein K and M are greater than 1. In this way, when the host system writes data from the first cluster and the first directory entry field, overwriting of the communication file and the FDB corresponding to the communication file is avoided.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
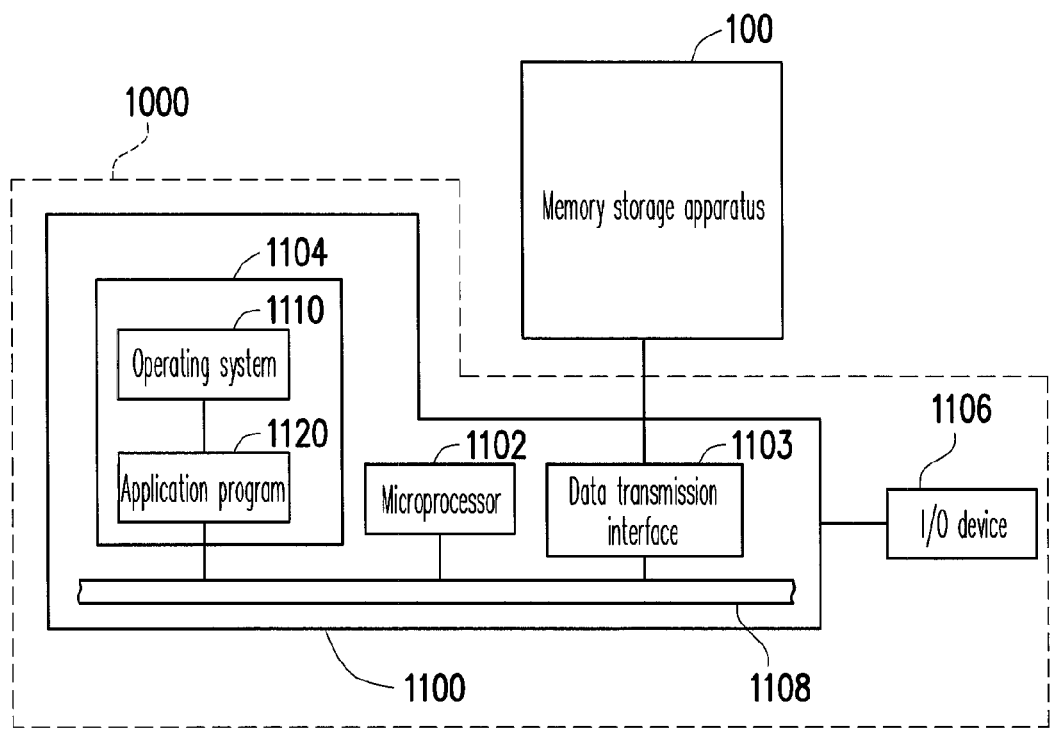
FIG. 1A is a diagram illustrating a host system and a memory storage apparatus according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together or A, B and C together.

It is to be noted that the term "a" or "an" entity refers to one or more of that entity. As such, the terms "a" (or "an"), "one or more" and "at least one" can be used interchangeably herein.

Generally, a memory storage apparatus (which is also referred to as a memory storage system) includes a rewritable non-volatile memory module and a controller (which is also referred to as a control circuit). The memory storage apparatus is generally used together with a host system to facilitate the host system writing data into the memory storage apparatus or reading data from the memory storage apparatus.

FIG. 1A is a diagram illustrating a host system and a memory storage apparatus according to an exemplary embodiment of the present invention.

Figure 1B:
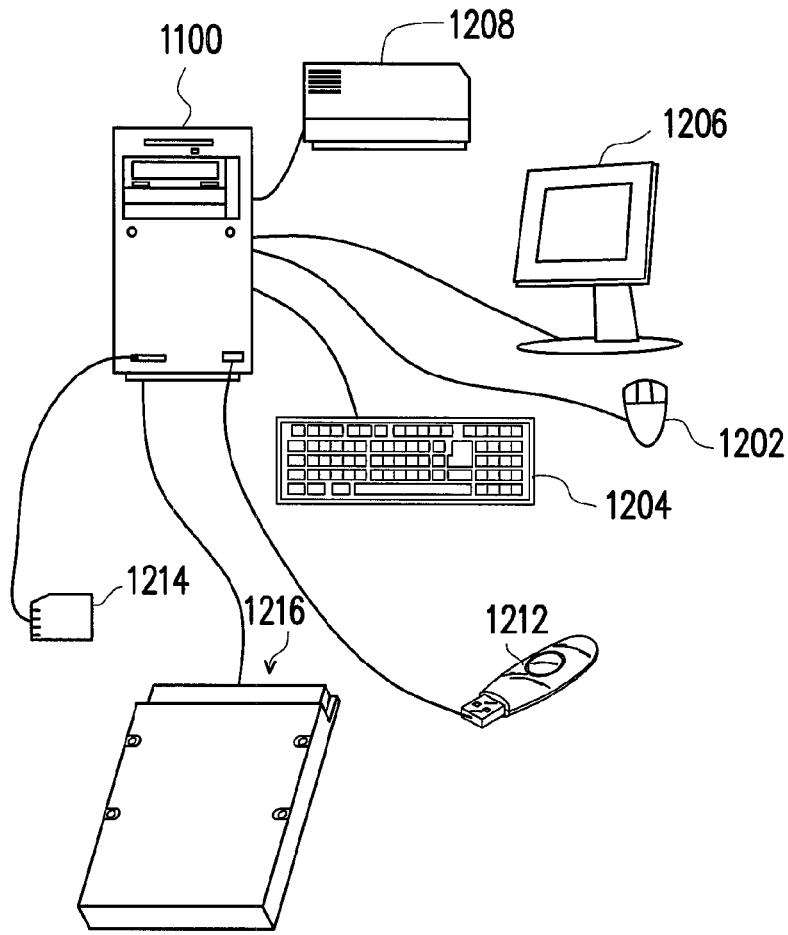
FIG. 1B is a schematic diagram of a computer, an input/output device and a memory storage apparatus according to an exemplary embodiment of the present invention.

Referring to FIG. 1A, the host system 1000 generally includes a computer 1100 and an input/output (I/O) device 1106. The computer 1100 includes a microprocessor 1102, a random access memory (RAM) 1104, a system bus 1108 and a data transmission interface 1103. The microprocessor 1102 executes an operating system 1110 stored in the RAM 1104 and an application program 1120, so that the host system 1000 can provide corresponding functions according to operations of a user. The I/O device 1106 includes a mouse 1202, a keyboard 1204, a display 1206 and a printer 1208 shown in FIG. 1B. It should be noticed that the devices shown in FIG. 1B are not used to limit the I/O device 1106, and the I/O device 1106 may also include other devices.

In the present embodiment, the memory storage apparatus 100 is coupled to the other devices of the host system 1000 through the data transmission interface 1103. Based on operations of the microprocessor 1102, the RAM 1104, and the I/O device 1106, data can be written into the memory storage apparatus 100 or read from the memory storage apparatus 100. For example, the memory storage apparatus 100 can be a rewritable non-volatile memory storage apparatus such as a flash drive 1212, a memory card 1214 or a solid state drive (SSD) 1216 shown in FIG. 1B.

Figure 1C:
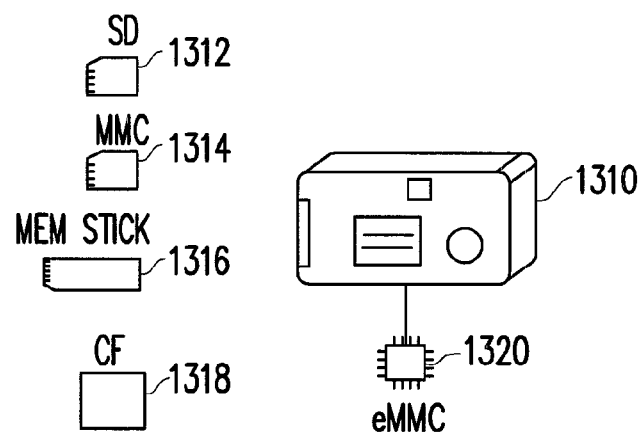
FIG. 1C is a schematic diagram of a host system and a memory storage apparatus according to an exemplary embodiment of the present invention.

Generally, the host system 1000 can be any system substantially used together with the memory storage apparatus 100 for storing data. In the present exemplary embodiment, the host system 1000 implemented by a computer system is taken as an example. However, in another exemplary embodiment of the invention, the host system 1000 can also be a digital camera, a video camera, a communication device, an audio player or a video player, etc. For example, when the host system is a digital camera (video camera) 1310, the rewritable non-volatile memory storage apparatus is a secure digital (SD) card 1312, a multimedia card (MMC) 1314, a memory stick (MS) card 1316, a compact flash (CF) card 1318 or an embedded storage device 1320 (shown in FIG. 1C) used therein. The embedded storage device 1320 includes an embedded MMC (eMMC). It should be noticed that the eMMC is directly coupled to a substrate of the host system.

Figure 1D:
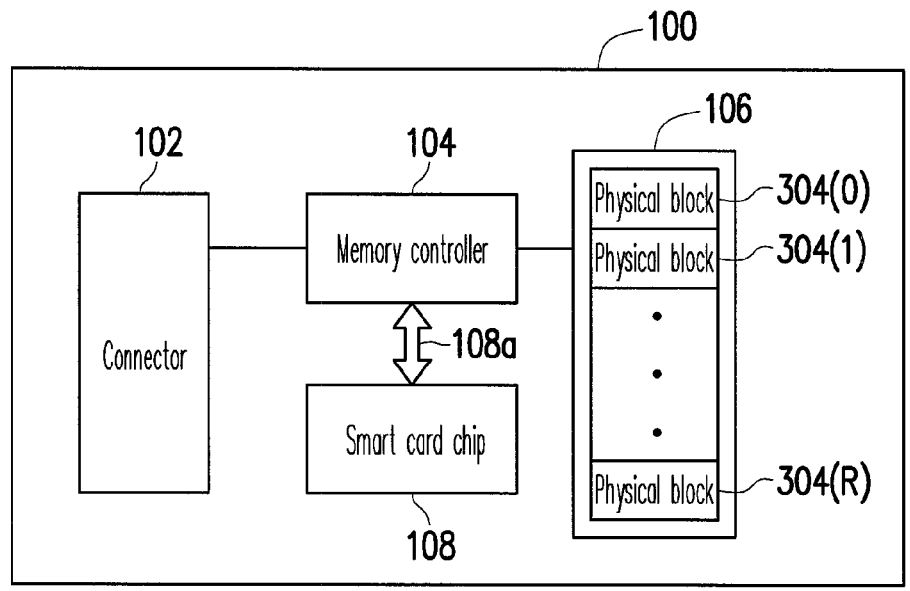
FIG. 1D is a schematic block diagram of a memory storage apparatus according to an exemplary embodiment of the present invention.

FIG. 1D is a schematic block diagram of a memory storage apparatus according to an exemplary embodiment of the invention.

Referring to FIG. 1D, the memory storage apparatus 100 includes a connector 102, a memory controller 104, a rewritable non-volatile memory module 106 and a smart card chip 108.

In the present exemplary embodiment, the connector 102 is complied with a secure digital (SD) interface standard. However, it should be noticed that the present invention is not limited thereto, and the connector 102 may also be complied with a parallel advanced technology attachment (PATA) standard, an institute of electrical and electronic engineers (IEEE) 1394 standard, a peripheral component interconnect express (PCI express) standard, a universal serial bus (USB) standard, a serial advanced technology attachment (SATA) standard, a MS interface standard, a MMC interface standard, a CF interface standard, an integrated drive electronics (IDE) interface standard or other suitable standards.

The memory controller 104 may execute a plurality of logic gates or control instructions implemented in a hardware form or a firmware form, and may perform a writing operation, a reading operation or an erasing operation to the rewritable non-volatile memory module 106 according to commands of the host system 1000.

The rewritable non-volatile memory module 106 is coupled to the memory controller 104 for storing data written by the host system 1000. The rewritable non-volatile memory module 106 has physical blocks 304(0)-304(R). For example, the physical blocks 304(0)-304(R) may belong to a same memory die or belong to different memory dies. Each of the physical blocks has a plurality of physical pages, and each physical page has at least one physical sector, wherein the physical pages belonging to the same physical block may be individually written and must be simultaneously erased. For example, each physical block is composed of 128 physical pages, and each physical page has 8 physical sectors. Namely, a capacity of each physical page is 4 kilobyte (KB). However, it should be noticed that the present invention is not limited thereto, and each physical block can be composed of 64 physical pages, 256 physical pages or any other number of the physical pages.

In details, each physical block is the smallest erasing unit. Namely, each physical block contains the least number of memory cells that are erased together. And, one physical page is the smallest programming unit. Namely, each physical page is the smallest unit for writing data. However, it should be understood that in another exemplary embodiment, the smallest unit for writing data may be one sector or other size. Each physical page usually includes a data bit area and a redundant bit area. The data bit area is used for storing user data, and the redundant bit area is used for storing system data (for example, the ECC code).

In the present exemplary embodiment, the rewritable non-volatile memory module 106 is a multi level cell (MLC) NAND flash memory module. However, the invention is not limited thereto, and the rewritable non-volatile memory module 106 may also be a single level cell (SLC) NAND flash memory module, other flash memory modules or other memory modules having the same characteristic.

Figure 1E:
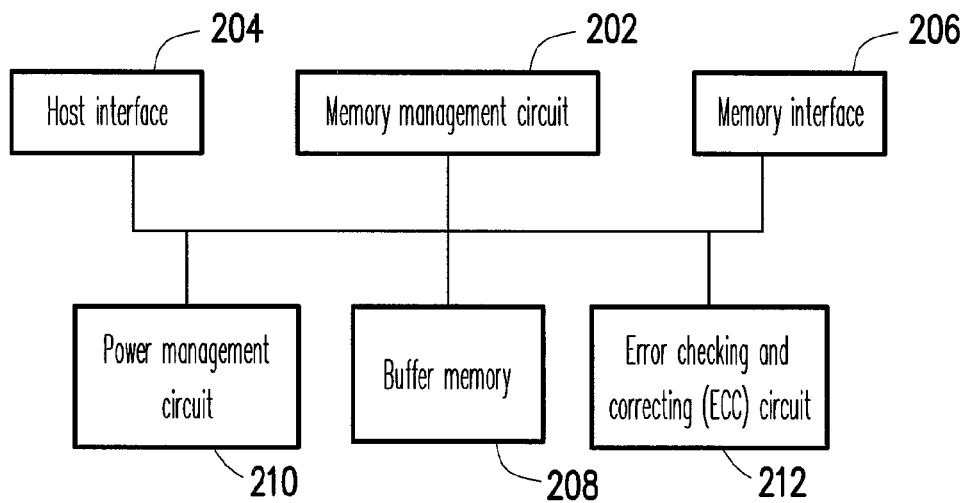
FIG. 1E is a schematic block diagram of a memory controller according to an exemplary embodiment of the present invention.

FIG. 1E is a schematic block diagram of a memory controller according to an exemplary embodiment of the present invention.

Referring to FIG. 1E, the memory controller 104 includes a memory management circuit 202, a host interface 204, a memory interface 206, a buffer memory 208, a power management circuit 210 and an error checking and correcting (ECC) circuit 212.

The memory management circuit 202 is configured for controlling a whole operation of the memory controller 104. In detail, the memory management circuit 202 has a plurality of control instructions, and when the memory storage apparatus 100 is power-on, these control instructions are executed to control the whole operation of the memory controller 104.

In the present exemplary embodiment, the control instructions of the memory management circuit 202 are implemented in a firmware form. For example, the memory management circuit 202 has a micro processing unit (not shown) and a read-only memory (not shown), and these control instructions are burned in the read-only memory. When the memory storage apparatus 100 is operated, these control instructions are executed by the micro processing unit.

In another exemplary embodiment, the control instructions of the memory management circuit 202 may also be stored in a specific area (for example, a system area used for storing system data in the memory module) of the rewritable non-volatile memory module 106 as program codes. Moreover, the memory management circuit 202 has a micro processing unit (not shown), a read-only memory (not shown) and a random access memory (RAM) (not shown). Particularly, the read-only memory has boot codes, and when the memory controller 104 is enabled, the micro processing unit first runs the boot codes to load the control instructions stored in the rewritable non-volatile memory module 106 to the RAM of the memory management circuit 202. Then, the micro processing unit executes these control instructions.

Moreover, in another exemplary embodiment of the present invention, the control instructions of the memory management circuit 202 may also be implemented in a hardware form. For example, the memory management circuit 202 includes a micro controller, a memory management unit, a memory writing unit, a memory reading unit, a memory erasing unit and a data processing unit. The memory management unit, the memory writing unit, the memory reading unit, the memory erasing unit and the data processing unit are coupled to the micro controller. The memory management unit is used for managing the physical blocks of the rewritable non-volatile memory module 106. The memory writing unit is used for sending a write command to the rewritable non-volatile memory module 106 to write data into the rewritable non-volatile memory module 106. The memory reading unit is used for sending a read command to the rewritable non-volatile memory module 106 to read data from the rewritable non-volatile memory module 106. The memory erasing unit is used for sending an erase command to the rewritable non-volatile memory module 106 to erase data in the rewritable non-volatile memory module 106. The data processing unit is used for processing data to be written into the rewritable non-volatile memory module 106 and data read from the rewritable non-volatile memory module 106.

The host interface 204 is coupled to the memory management circuit 202, and is configured for receiving and recognizing commands and data transmitted by the host system 1000. Namely, the commands and data transmitted by the host system 1000 are transmitted to the memory management circuit 202 through the host interface 204. In the present exemplary embodiment, the host interface 204 is complied with the SD standard. However, the present invention is not limited thereto, and the host interface 204 can also be complied with MS standard, the MMC standard, the CF standard, the PATA standard, the IEEE 1394 standard, the PCI express standard, the SATA standard, the USB standard, the IDE standard or other suitable data transmission standards.

The memory interface 206 is coupled to the memory management circuit 202 and is configured to access the rewritable non-volatile memory module 106. Namely, data to be written into the rewritable non-volatile memory module 106 is converted into a format that can be accepted by the rewritable non-volatile memory module 106 through the memory interface 206.

The buffer memory 208 is coupled to the memory management circuit 202 and is configured to temporarily store data and commands from the host system 1000 or data from the rewritable non-volatile memory module 106.

The power management circuit 210 is coupled to the memory management circuit 202 and is configured to control the power of the memory storage apparatus 100.

The ECC circuit 212 is coupled to the memory management circuit 202 and is configured to perform an error checking and correcting procedure to ensure correctness of data. In detail, when the memory management circuit 202 receives a write command from the host system 1000, the ECC circuit 212 generates a corresponding error checking and correcting code (ECC code) for data corresponding to the write command, and the memory management circuit 202 writes the data corresponding to the write command and the corresponding ECC code to the rewritable non-volatile memory module 106. Then, when the memory management circuit 202 reads data from the rewritable non-volatile memory module 106, it simultaneously reads the ECC code corresponding to the data, and the ECC circuit 212 performs the error checking and correcting procedure on the read data according to the ECC code.

Figure 2:
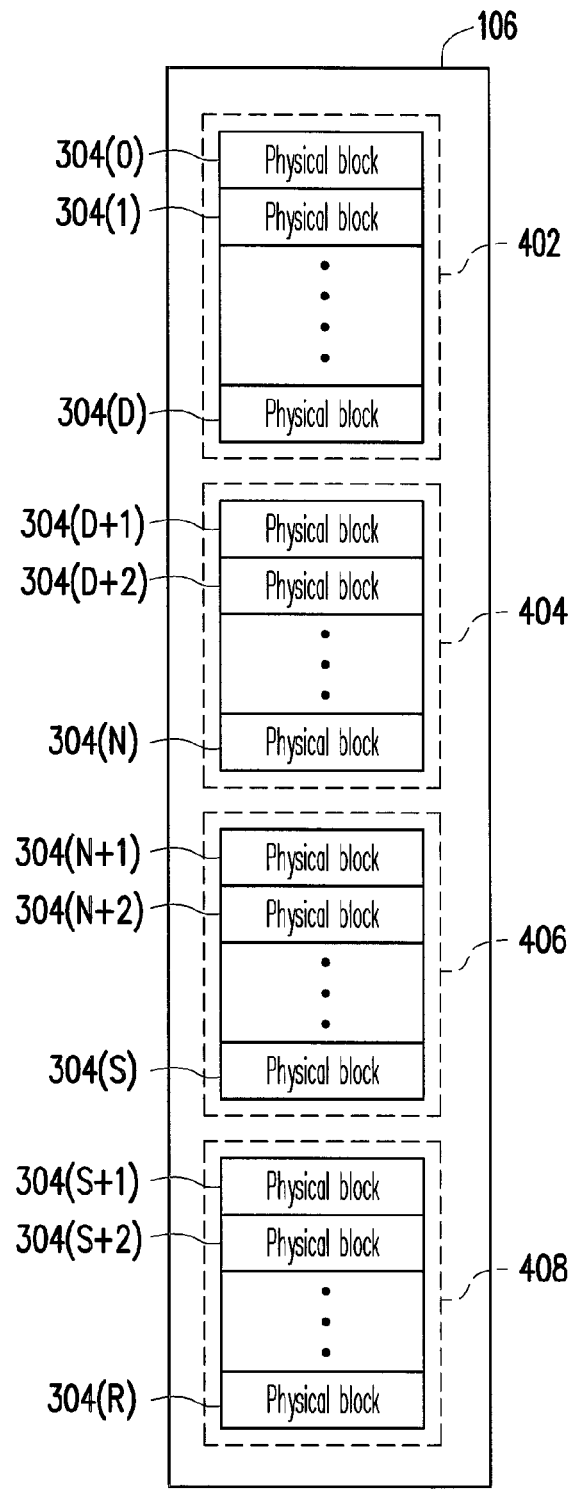
FIG. 2 and FIG. 3 are schematic diagrams illustrating examples of managing a rewritable non-volatile memory module according to an exemplary embodiment of the present invention.
Figure 3:
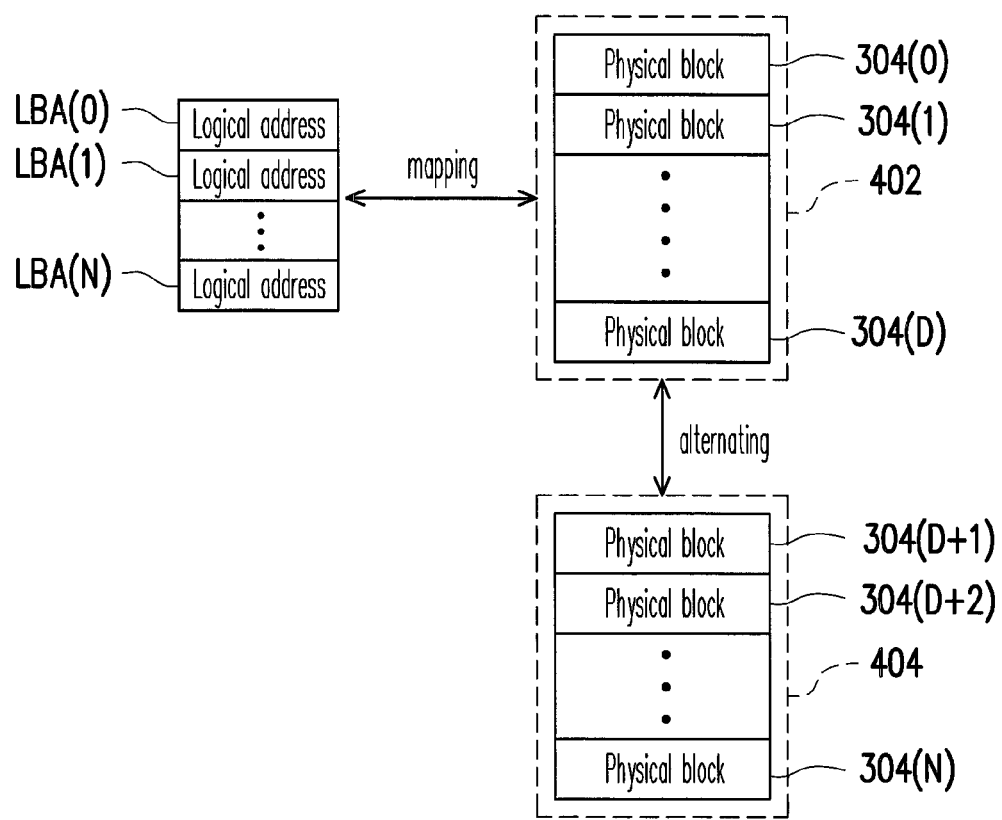

FIG. 2 and FIG. 3 are schematic diagrams illustrating examples of managing the rewritable non-volatile memory module according to an exemplary embodiment of the present invention.

It should be noticed that the terms used for describing operations of the rewritable non-volatile memory module 106 such as "select", "exchange", "group" and "alternate", etc. for operating the physical blocks of the rewritable non-volatile memory module 106 are only logical concepts. Namely, actual positions of the physical blocks of the rewritable non-volatile memory module are not changed, and the physical blocks of the rewritable non-volatile memory module are only operated logically.

Referring to FIG. 2, the memory controller 104 logically groups the physical blocks 304(0)-304(R) of the rewritable non-volatile memory module 106 into a data area 402, a spare area 404, a system area 406 and a replacement area 408.

The physical blocks of the data area 402 and the spare area 404 are used to store data from the host system 1000. In detail, the physical blocks of the data area 402 are regarded as physical blocks already stored with data, and the physical blocks of the spare area 404 are used for substituting the physical blocks of the data area 402. Therefore, the physical blocks of the spare area 404 are empty or available physical blocks, i.e. physical blocks that are not stored with data or physical blocks stored with data marked to be invalid. Namely, the physical blocks in the spare area 404 are already erased, or before the physical block in the spare area 404 is selected to store data, an erase operation is first performed to the selected physical block. Therefore, the physical blocks of the spare area 404 are available physical blocks.

The physical blocks logically belonged to the system area 406 are used for recording system data, wherein the system data includes a manufacturer and a model number of the memory chip, the number of the physical blocks of the rewritable non-volatile memory module, and the number of physical pages in each physical block, etc.

The physical blocks logically belonged to the replacement area 408 are replacement physical blocks. For example, when the rewritable non-volatile memory module 106 is manufactured, 4% of the physical blocks therein are preserved for replacement. Namely, when the physical blocks in the data area 402, the spare area 404 and the system area 406 are damaged, the physical blocks preserved in the replacement area 408 are used to replace the damaged physical blocks (i.e. bad blocks). Thus, if there are still normal physical blocks in the replacement area 408 and a physical block is damaged, the memory controller 104 gets a normal physical block from the replacement area 408 to replace the damaged physical block. If there is no more normal physical block in the replacement area 408 and a physical block is damaged, the memory controller 104 announces that the memory storage apparatus 100 is at a write protect status and can not be used for writing data any more.

Particularly, the numbers of the physical blocks in the data area 402, the spare area 404, the system area 406 and the replacement area 408 are different according different memory specifications. Moreover, it should be noticed that during the operation of the memory storage apparatus 100, the physical blocks grouped into the data area 402, the spare area 404, the system area 406, and the replacement area 408 are dynamically changed. For example, when a physical block in the spare area 404 is damaged and replaced by a physical block selected from the replacement area 408, the physical block originally in the replacement area 408 is associated with the spare area 404.

Referring to FIG. 3, as described above, the physical blocks of the data area 402 and the spare area 404 are used to store the data written by the host system 1000 in alternation. In the present exemplary embodiment, the memory controller 104 configures logical addresses LBA(0)-LBA(N) to the host system 1000 to facilitate accessing data in the physical blocks that store data in alternation. In detail, when the memory storage apparatus 100 is formatted by the operating system 1110 according to a file system (for example, a file allocation table (FAT) 32), the logical addresses LBA(0)-LBA(N) respectively map to the physical blocks 304(0)-304(D) of the data area 402. Namely, one logical address maps to one physical block in the data area 402. The memory management circuit 202 establishes a logical address-physical block mapping table to record a mapping relationship of the logical addresses and the physical blocks.

Figure 4:
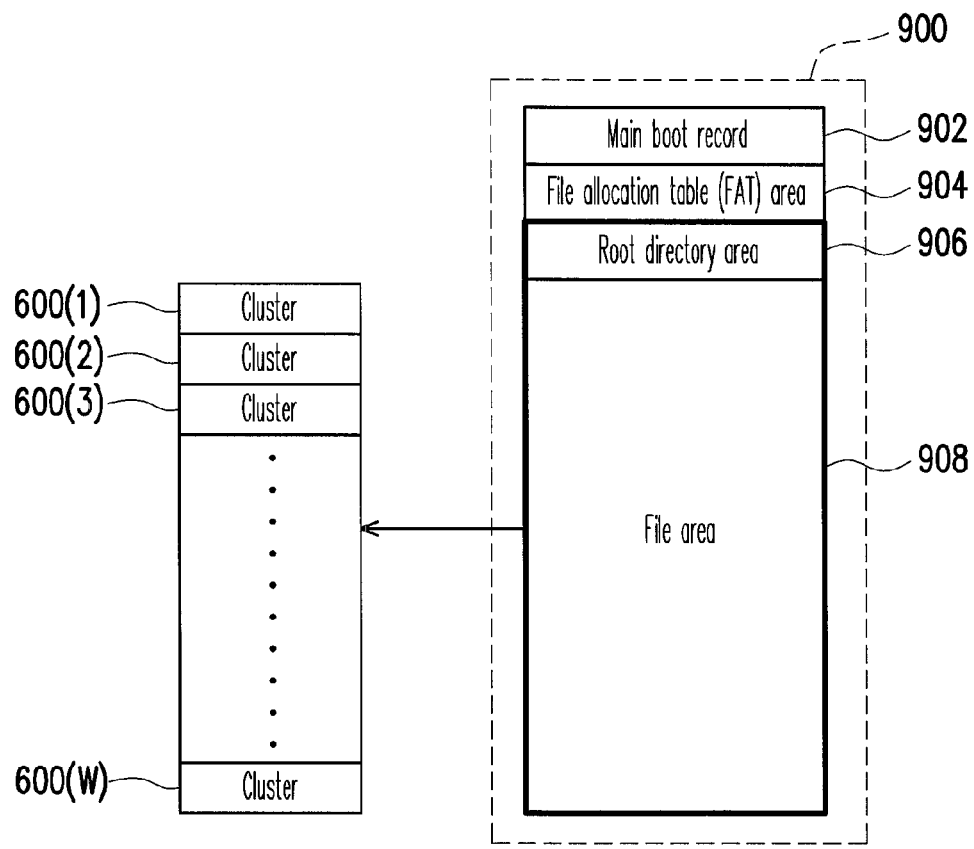
FIG. 4 is a schematic diagram of an example of a file system according to an exemplary embodiment of the present invention.

In the present exemplary embodiment, the operating system 1110 of the host system 1000 uses the file system to format the logical addresses LBA(0)-LBA(N) into one partition 900 (shown in FIG. 4), wherein the partition 900 includes a main boot record 902, a file allocation table (FAT) area 904, a root directory area 906 and a file area 908.

The logical addresses belonging to the main boot record 902 are used to store system information of an available space of the memory storage apparatus 100.

The logical addresses belonging to the FAT area 904 is used to store a FAT. The FAT is used to record clusters corresponding to the logical addresses stored a file. For example, two FATs are stored in the FAT area 904, and one FAT is used for normal data accessing, and another FAT is a backup FAT.

The logical addresses belonging to the root directory area 906 are used to store a file description block (FDB), which records attribution information of files and directories currently stored in the memory storage apparatus 100. Particularly, the FDB records a start storage address (i.e. a start cluster) used for storing the files.

The logical addresses belonging to the file area 908 are used to actually store the contents of the files.

In detail, a smallest storage unit of a disc is a sector, and each sector includes information of 512 bytes. However, when the sector is taken as a unit for storage, efficiency of the host system 1000 is poor. Generally, the operating system 1110 of the host system 1000 does not take a sector as a unit for accessing files, but takes a cluster as a basic unit for accessing files. Each cluster is constructed by a power of 2 of the sectors. It is assumed that 8 consecutive sectors form one cluster, a size of the cluster is 4096 bytes. Therefore, when the operating system 1110 accesses data, it continually access data of 8 sectors, so that the efficiency thereof is improved. However, the cluster is not the larger the better since when the cluster is large, a lot of storage spaces are probably wasted. For example, in case that one cluster is 4 kilobyte (KB), when the file content stored by the host system 1000 is only 1 KB, the file still occupies the space of one cluster, and the storage space of 3 KB is wasted. Particularly, the total number of the clusters is probably limited by a capacity of the rewritable non-volatile memory module and a pattern of the FAT. Taking a FAT16 as an example, according to a definition of the FAT16, a maximum cluster number thereof has to be between 4048 and 65526, so that when a memory card of 128 MB is formatted, each cluster thereof has to contain 4 sectors, or otherwise the limitation of 65526 clusters is exceeded (127, 901,696/512/4=62,452 clusters). Therefore, a size of each cluster is 2 KB. Similarly, in the FAT32, a maximum cluster number thereof has to be between 65526 and 4177918. It should be noticed that in the FAT16, a size of the root directory area 906 is fixed. In the FAT32, the root director area 906 is put in the file area 908 for management.

For example, in the present exemplary embodiment, the partition 900 is complied with the standards of the FAT32. Therefore, the sectors belonging to the root directory area 906 and the file area 908 are grouped into clusters 600(1)-600(W). It is assumed that the cluster 600(1) is configured as a start cluster of the root directory area 906.

Figure 5:
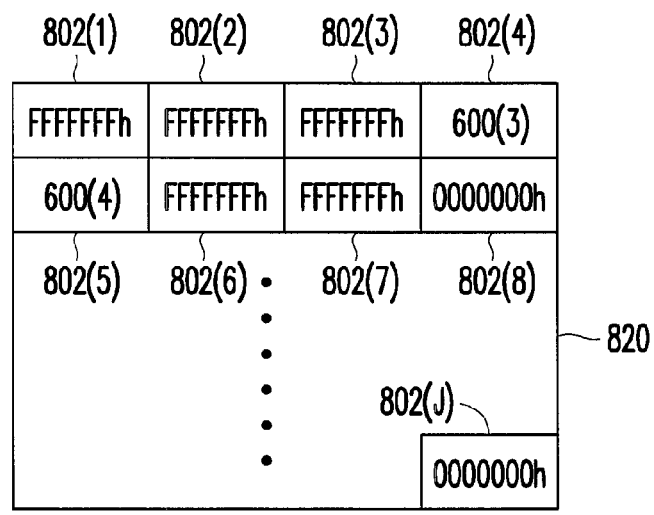
FIG. 5 is a schematic diagram of a file allocation table (FAT) area according to an exemplary embodiment of the present invention.
Figure 6:
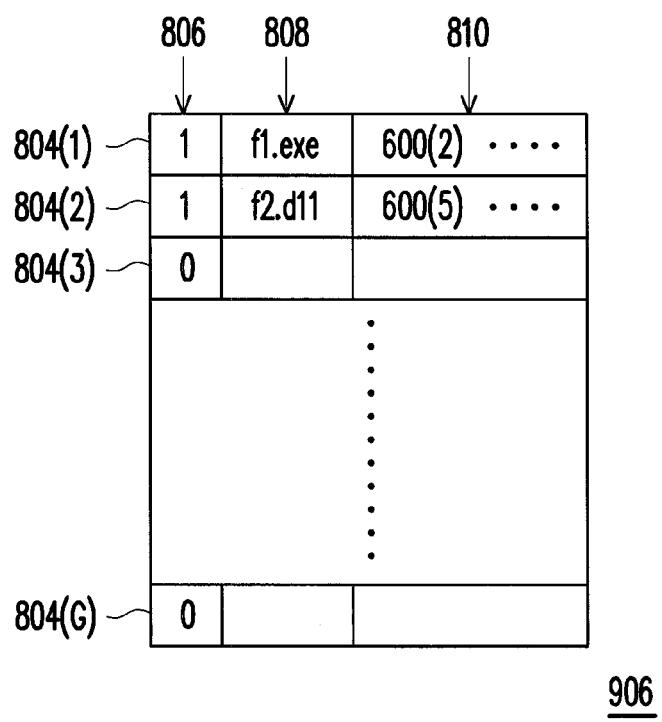
FIG. 6 is a schematic diagram of a root directory area according to an exemplary embodiment of the present invention.

FIG. 5 and FIG. 6 are schematic diagrams of an FAT and an FDB according to an exemplary embodiment of the present invention.

Referring to FIG. 5, the FAT area 904 at least includes an FAT 820, and the FAT 820 has cluster entry fields 802(1)-802(J). Here, the cluster entry field 802(1) and the cluster entry field 802(2) are preserved for filling in predetermined values. Moreover, each of the cluster entry fields started from the cluster entry field 802(3) corresponds to one of the aforementioned clusters. For example, the cluster entry field 802(3) corresponds to the cluster 600(1), the cluster entry field 802(4) corresponds to the cluster 600(2), and the others are deduced by analogy. The cluster entry fields correspond to the clusters are respectively filled with an entry value to represent a link relationship of the clusters.

Here, the entry value of the cluster entry field uses special characters to represent a state of the corresponding cluster. For example, in the FAT32, when the cluster entry field is filled with "0000000h", it represents that the cluster is a free cluster (i.e. a cluster not stored with data). For example, the cluster 600(6) corresponding to the cluster entry field 802(8) is a free cluster. Moreover, when the cluster entry field is filled with "FFFFFF8h"-"FFFFFFFh", it represents that the cluster is the last cluster of the stored file. Here, "FFFFFF8h"-"FFFFFFFh" are also referred to as end of cluster chain marks (EOC marks), for example, the content recorded in the cluster entry fields 802(3), 802(6) and 802(7) are all the EOC marks. Moreover, when the cluster entry field is filled with a logical address of one cluster, it represents that such cluster continues to store data by following a cluster corresponding to the cluster entry field. For example, a value recorded in the cluster entry field 802(4) is 600(3), it represents that the cluster 600(3) continues to store data of the corresponding file by following the cluster 600(2). Moreover, the cluster entry field 802(5) corresponds to the cluster 600(3), and the recorded entry value is 600(4), it represents that the cluster 600(4) continues to store data of the corresponding file by following the cluster 600(3). Therefore, according to the information in the cluster entry fields 802(4) and 802(5), the operating system 1110 can learn that a certain file is sequentially stored in the clusters 600(2), 600(3) and the cluster 600(4).

Referring to FIG. 6, the root directory area 906 includes directory entry fields 804(1)-804(G), and each of the directory entry fields includes a free field 806, a file name and extension name field 808 and a start cluster field 810.

A value recorded in the free field 806 is used to represent whether the directory entry field is used. For example, when the value recorded in the free field 806 is "0", it represents that the directory entry field is not used, and the unused directory entry field is referred to as free directory entry field. When the value recorded in the free field 806 is "1", it represents that the directory entry field has been used.

A value recorded in the file name and extension name field 808 is used to represent a file name and extension name corresponding to the directory entry field. For example, the directory entry field 804(1) records a file name and extension name of "f1.exe", which represents that the directory entry field 804(1) corresponds to the file "f1.exe".

A value recorded in the start cluster field 810 is used to represent a first cluster used for storing a file (or subdirectory) corresponding to the directory entry field. Namely, the file corresponding to the directory entry field is probably sequentially stored in a plurality of clusters, and the start cluster field 810 records the first one of the clusters. For example, a value recorded in the start cluster field 810 of the directory entry field 804(1) is 600(2), which represents that a start position for storing the file "f1.exe" is the cluster 600(2). Deduced by analogy, the directory entry field 804(2) corresponds to a file name and extension name of "f2.dll", and a start position for storing the file "f2.dll" is the cluster 600(5). However, it should be noticed that the directory entry field may further include other fields to represent other information of a file, such as the size of the file, a final modification time of the file or a read-only state, etc., and the number and types of the fields included in the directory entry field are not limited by the invention. On the other hand, the fields used for describing the file information are also referred to as file description blocks (FDBs). In other words, if a directory entry field is used, it corresponds to a file or a subdirectory, and the used directory entry field includes a plurality of fields used for describing the file or the subdirectory, wherein the directory entry field is referred to as an FDB corresponding to the file or the subdirectory.

Referring to FIG. 5 and FIG. 6, according to information in the FAT area 904 and the root directory area 906, the operating system 1110 learns that the memory storage apparatus 100 stores two files of "f1.exe" and "f2.dll", wherein the start logical address for storing the file "f1.exe" is the cluster 600(2), and the start logical address for storing the file "f2.dll" is the cluster 600(5). Moreover, according to the cluster entry fields in the FAT area 904, the operating system 1110 learns that the file "f1.exe" is sequentially stored in the cluster 600(2), the cluster 600(3) and the cluster 600(4), and the file "f2.dll" is only stored in the cluster 600(5).

Moreover, it should be noticed that in the FAT32, since the root directory area 906 is managed together with the file area 908, the cluster belonging to the root directory area 906 can be dynamically expended to record more FDBs, so that the number of the files stored in the memory storage apparatus 100 is not limited. In detail, the FAT area 904 records the next cluster entry field corresponding to the start cluster of the root directory area 906.

Referring to FIG. 1D, in the present exemplary embodiment, the memory storage apparatus 100 further includes the smart card chip 108. The smart card chip 108 is coupled to the memory controller 104 through an interface 108a, wherein the interface 108a is specifically used to communicate with the smart card chip 108.

The smart card chip 108 has a microprocessor, a security module, a read only memory (ROM), a random access memory (RAM), an electrically erasable programmable read-only memory (EEPROM), and an oscillator, etc. The microprocessor is used to control a whole operation of the smart card chip 108. The security module is used to encrypt and decrypt data stored to the smart card chip 108. The oscillator is used to generate a clock signal required during the operation of the smart card chip 108. The RAM is used to temporarily store calculated data or a firmware program. The EEPROM is used to store user data. The read-only memory is used to store the firmware program of the smart card chip 108. In detail, when the smart card chip 108 operates, the microprocessor of the smart card chip 108 executes the firmware program stored in the read-only memory to perform related operations.

Particularly, the security module of the smart card chip 108 executes a security mechanism to prevent an attack with an intention to steal the data stored in the smart card chip 108. For example, the attack includes a timing attack, a single-power-analysis attack or a differential-power-analysis attack. Moreover, the security mechanism executed by the smart card chip 108 is compiled with a third level or a higher level of federal information processing standards (FIPS) 140-2 or complied with a third level or a higher level of EMV EL. Namely, the smart card chip 108 passes authentication of higher than a fourth level of FIPS 140-2 or passes authentication of higher than a fourth level of EMV EL. Here, the FIPS are open standards specified by U.S. federal government for government agencies and government contractors except military institutions, wherein FIPS 140-2 specifies data security levels. Moreover, the EMV is a professional trade and authentication standard specification specified by the international financial industry for point-of-sale (POS) terminals capable of using smart cards and chip cards and automatic teller machines (ATMs) widely used in banking institutions. Such specification includes standards set for related software and hardware of the payment system of chip credit cards and cash cards. In the present exemplary embodiment, based on the operation of the smart card chip 108, the memory storage apparatus 100 may provide services having an ID authentication function, for example, a micro-payment service and a ticket service, etc.

It should be noticed that the smart card chip 108 receives commands and data from the host system 1000 or transmits data to the host system 1000 through the connector 102 of the memory storage apparatus 100 other than directly communicates with the host system 1000 through a smart card interface (i.e. the interface 108a). Therefore, in the present exemplary embodiment, the application program 1120 is installed in the host system 1000, and a specific communication file is used to transmit a command data unit (for example, a command-application protocol data unit (C-APDU) to the smart card chip 108 and receive a response data unit (for example, a response-application protocol data unit (R-APDU) of the smart card chip 108.

Figure 7:
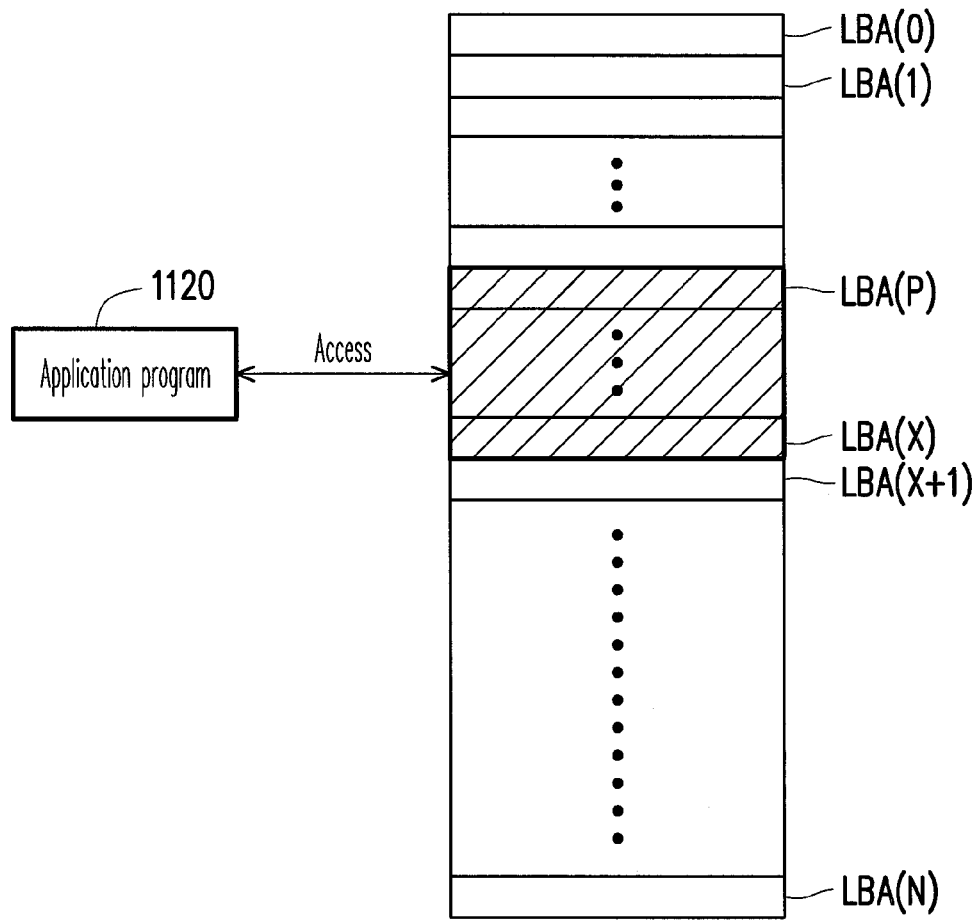
FIG. 7 is a schematic diagram of an example that an application program accesses a communication file according to an exemplary embodiment of the present invention.

In detail, in the present exemplary embodiment, the memory controller 104 generates one or a plurality of communication files in the memory storage apparatus 100, and transmits information of logical addresses used for storing the one or the plurality of communication files to the application program 1120. For example, when the application program 1120 sends a command to store a communication file (for example, a file with a file name RESP.BIN) in the memory storage apparatus 100, the operating system 1110 uses a part of logical addresses (for example, logical addresses LBA(P)-LBA(X)) to write the communication file according to the file system (not shown) of the memory storage apparatus 100. Here, the logical addresses used for storing the communication file are referred to as specific logical addresses (shown by oblique lines in FIG. 7). Then, any operation performed in allusion to the smart cart chip 108 is implemented by the application program 1120 by accessing the communication file. For example, the application program 1120 transmits the C-APDU to the memory storage apparatus 100 through a write command of the communication file, and reads the R-APDU from the memory storage apparatus 100 through a read command of the communication file. It should be noticed that in the other operating system, the application program 1120 can also directly access the specific logical addresses used for storing the communication file, so as to execute operations performed in allusion to the smart card chip 108.

In the present exemplary embodiment, after the memory storage apparatus 100 is formatted, the memory controller 104 initializes the FAT area 904 and the root directory area 906.

Figure 8:
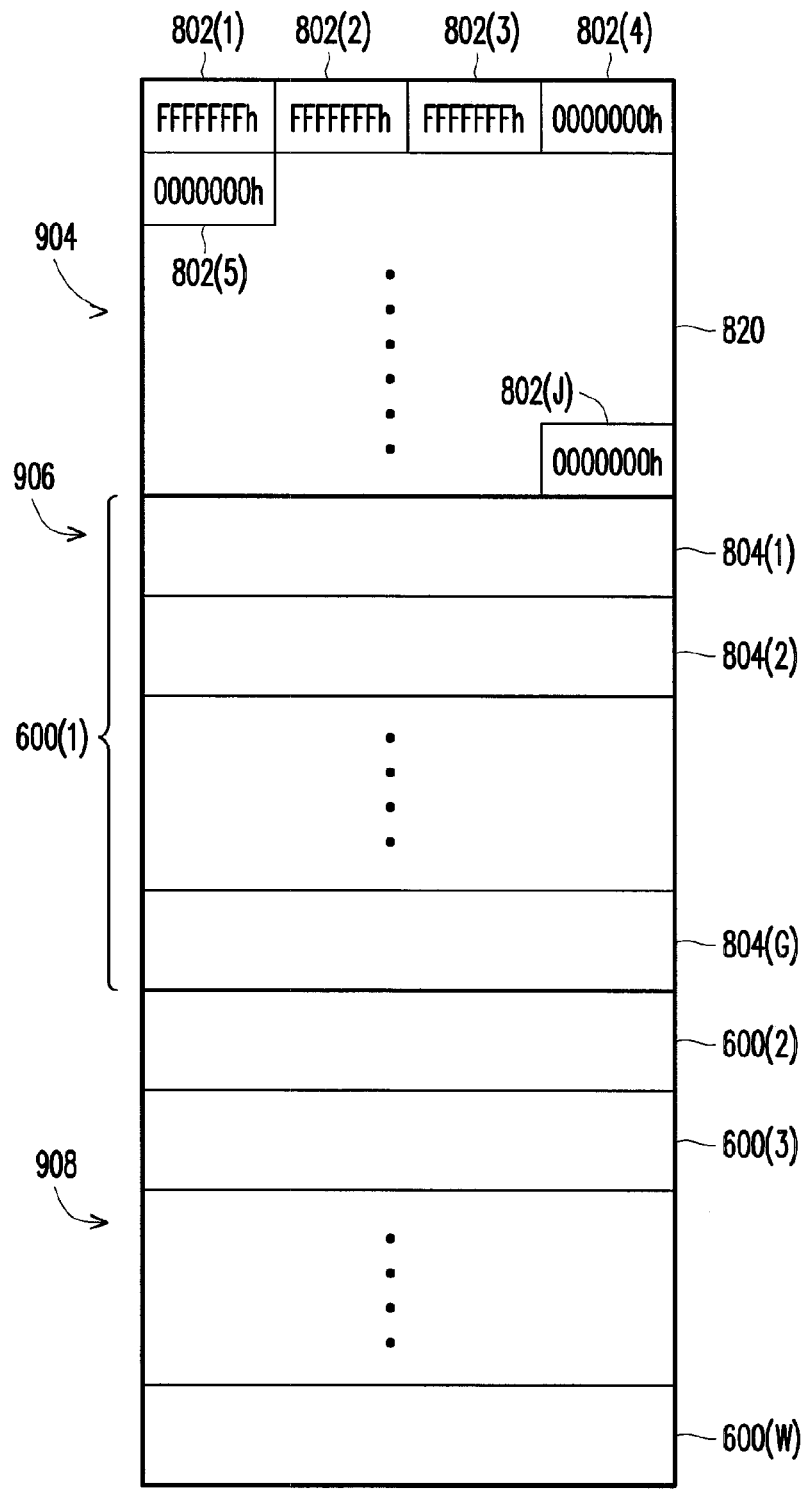
FIG. 8 is a schematic diagram of a formatted memory storage apparatus according to an exemplary embodiment of the present invention.

FIG. 8 is a schematic diagram of a formatted memory storage apparatus according to an exemplary embodiment of the present invention.

Referring to FIG. 8, after the FAT area 904 is initialized, the cluster entry fields 802(1) and 802(2) record predetermined values of the file system, for example, "FFFFFFFh". The cluster entry field 802(3) corresponds to the cluster 600(1) to serve as the root directory area 906. Moreover, the cluster entry field 802(3) records "FFFFFFFh", which represents that the root directory area 906 only occupies one cluster (i.e. the cluster 600(1)). In other embodiments, the root directory area 906 may also occupy more than two clusters, which is not limited by the invention. The cluster entry fields 802(4)-802(J) respectively correspond to clusters 600(2)-600(W) in the file area 908, in which "0000000h" is recorded, which represents that the clusters 600(2)-600(W) are free clusters with no file stored therein. On the other hand, after the root directory area 906 is initialized, the directory entry fields 804(1)-804(G) are not used, which represents that the memory storage apparatus 100 does not store any file, presently.

After the FAT area 904 and the root directory area 906 are initialized, the communication file can be stored in one of the clusters 600(2)-600(W) in the file area 908. It should be noticed that since the information of the communication file is filled in the FAT area 904 and the root directory area 906 by the memory management circuit 202 of the memory controller 104 after the memory storage apparatus 100 is formatted, before the host system 1000 rereads the information of the FAT area 904 and the root directory area 906, the host system 1000 cannot learn the cluster where the communication file is stored. Namely, the host system 1000 identifies that the memory storage apparatus 100 does not store any file after being formatted.

It is assumed that after the memory storage apparatus 100 is formatted, the communication file is stored in the first cluster (i.e. the cluster 600(2)) of the file area, and the FDB of the communication file is recorded in the first directory entry field (i.e. the directory entry field 804(1)). And, if the host system 1000 determines the first cluster 600(2) to be a free cluster and uses the first cluster 600(2) to store data before rereading the information of the FAT area 904 and the root directory area 906, the communication file stored in the cluster 600(2) and the FDB corresponding to the communication file that is recorded in the directory entry field 804(1) are probably overwritten to cause malfunction of the smart card chip 108.

In order to resolve the above problem, in the present exemplary embodiment, the memory controller 104 stores the communication file from a $K^{th}$ cluster of the file area 908, wherein K is a positive integer and is greater than 1 and smaller than the number of the clusters of the file area 908. Namely, the communication file is stored in at least one cluster in the file area 908, and a start cluster of the at least one cluster is the $K^{th}$ cluster. For example, in the present exemplary embodiment, the file area 908 includes W−1 clusters and K is a positive integer between 2 and W−1. In other words, when the communication file only occupies one cluster for storage, the communication file is stored in one of the clusters 600(3)-600(W). On the other hand, the memory controller 104 records the FDB corresponding to the communication file in the $M^{th}$ directory entry field in the root directory area 906, wherein M is a positive integer and is greater than 1 and smaller than the number of the directory entry fields. For example, in the present exemplary embodiment, the root directory area 906 includes G directory entry fields and M is a positive integer between 2 and G. Moreover, the memory controller 104 stores an end of cluster chain (EOC) mark in the cluster entry field of the FAT area 904 corresponding to the $K^{th}$ cluster of the file area 908.

Figure 9A:
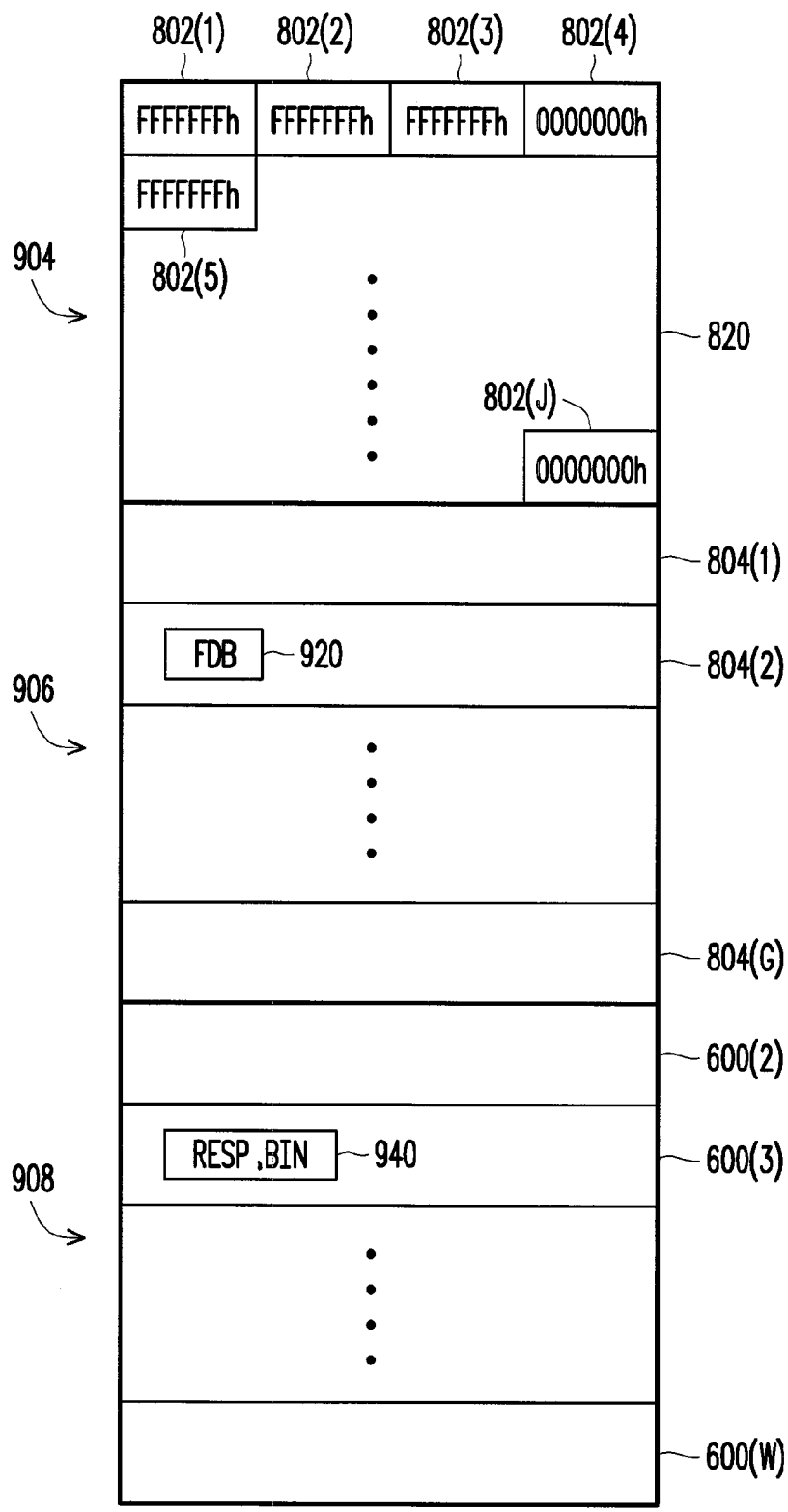
FIG. 9A is a schematic diagram of configuring a communication file to a second cluster of a file area according to an exemplary embodiment of the present invention.

FIG. 9A is a schematic diagram of configuring the communication file to a second cluster of the file area according to an exemplary embodiment of the present invention.

Referring to FIG. 9A, in the present exemplary embodiment, the memory management circuit 202 of the memory controller 104 stores the communication file 940 in the cluster 600(3), wherein the cluster 600(3) is the second cluster of the file area 908, i.e. K=2. Moreover, the memory management circuit 202 records an FDB 920 corresponding to the communication file in the directory entry field 804(2) of the root directory area 906, i.e. M=2. In addition, the memory management circuit 202 stores the EOC mark (i.e. "FFFFFFFh") in the cluster entry field 802(5) corresponding to the cluster 600(3).

Figure 9B:
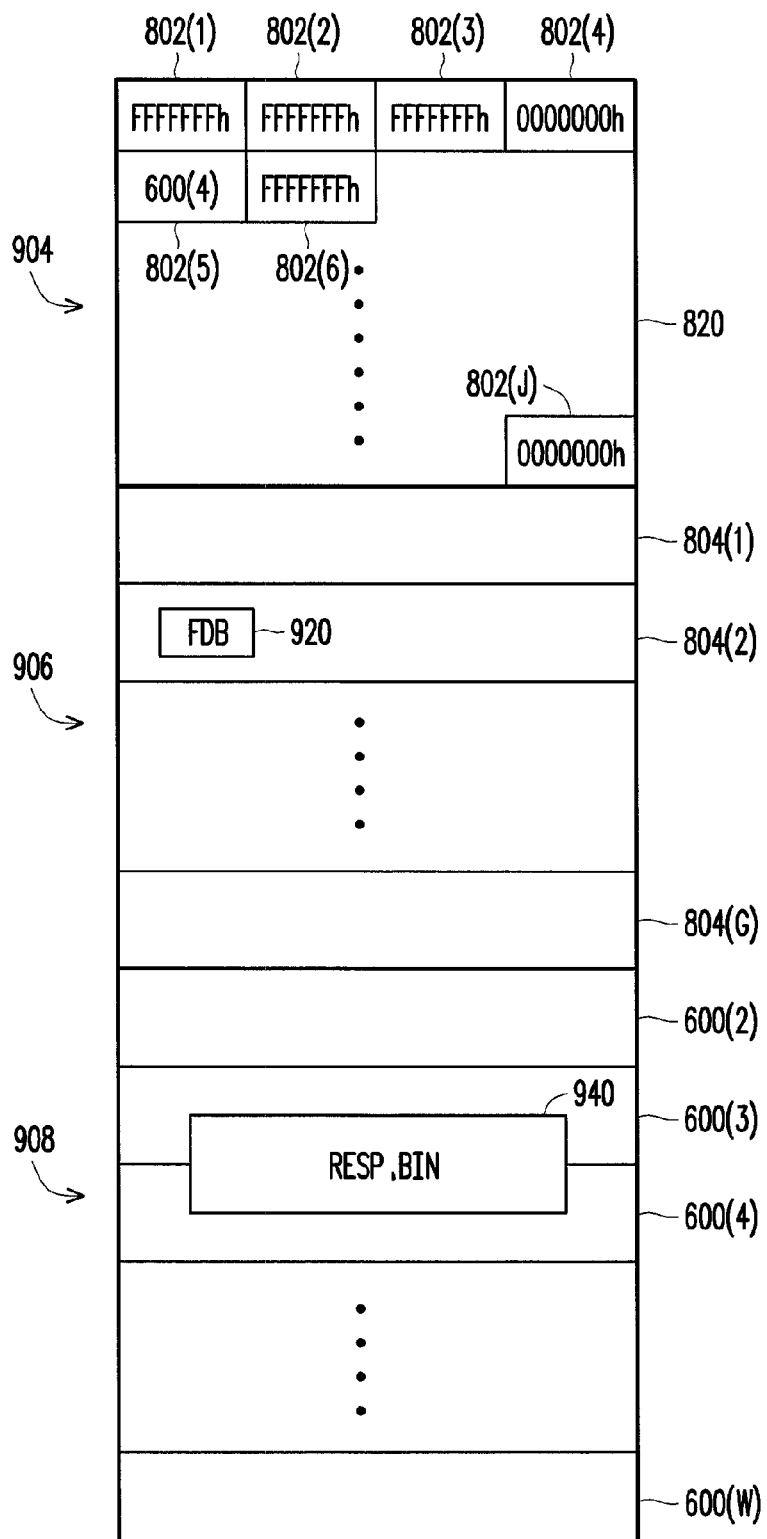
FIG. 9B is a schematic diagram of configuring a communication file to a plurality of clusters according to an exemplary embodiment of the present invention.

FIG. 9B is a schematic diagram of configuring the communication file to a plurality of clusters according to an exemplary embodiment of the present invention.

Referring to FIG. 9B, in this example, the communication file 940 is stored in two clusters, and a start cluster of the two clusters is the $K^{th}$ cluster. Namely, the memory management circuit 202 of the memory controller 104 stores the communication file from the $K^{th}$ cluster. In detail, the memory management circuit 202 stores the communication file 940 in the cluster 600(3) and the cluster 600(4), wherein the cluster 600(3) is the second cluster of the file area 908, i.e. K=2. Moreover, the memory management circuit 202 records the FDB 920 corresponding to the communication file in the directory entry field 804(2) of the root directory area 906, i.e., M=2. In addition, the memory management circuit 202 stores the EOC mark in the cluster entry field corresponding to the last cluster of the clusters where the communication file stores. In detail, since the commutation file is stored in the cluster 600(3) and the cluster 600(4), the cluster 600(4) is the last cluster of the communication file. The memory management circuit 202 stores the EOC mark (i.e. "FFFFFFFh") in the cluster entry field 802(6) corresponding to the last cluster (i.e. the cluster 600(4)). Besides, the memory management circuit 202 records "600(4) in the cluster entry field 802(5) corresponding to the cluster 600(3), which represents that the communication file 940 is consecutively stored in the cluster 600(3) and the cluster 600(4). However, it should be noticed that the communication file 940 can also be stored in three clusters or more than three clusters, and the invention does not limit the number of clusters occupied by the communication file 940.

Figure 10:
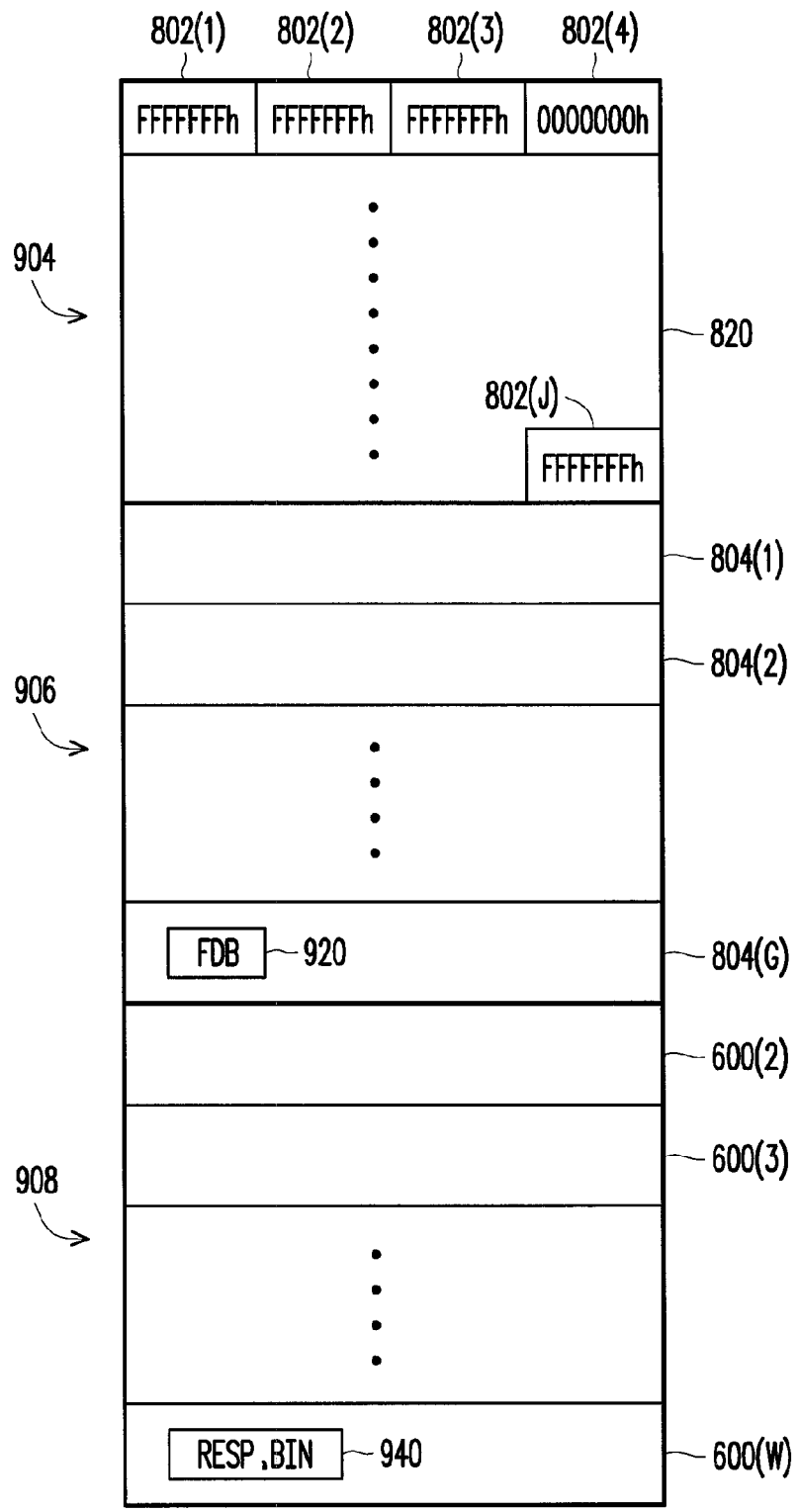
FIG. 10 is a schematic diagram of configuring a communication file to a last cluster of a file area according to another exemplary embodiment of the present invention.

FIG. 10 is a schematic diagram of configuring the communication file to a last cluster of the file area according to another exemplary embodiment of the present invention.

Referring to FIG. 10, in this example, the memory controller 104 stores the communication file 940 in the last cluster 600(W) of the file area 908. Moreover, the memory controller 104 records the FDB 920 corresponding to the communication file in a last directory entry field 804(G) of the root directory area 906. Moreover, the memory controller 104 records the EOC mark (i.e. "FFFFFFFh") in the cluster entry field 802(J) corresponding to the cluster 600(W).

It should be noticed that besides recording the information of the communication file in fixed addresses of the file system, in another exemplary embodiment, the memory controller 104 can also determine the values of K and M according to a size and the number of files to be written into the memory storage apparatus 100 by the host system 1000. For example, the memory controller 104 determines that the size of the file to be written by the host system 1000 is smaller than the size of one cluster, and the number of the file is 1 according to a past write record of the host system 1000. In this way, the memory controller 104 sets K and M to 2. When the memory controller 104 determines that the size of the file to be written by the host system 1000 is greater than the size of one cluster, or the number of the files is greater than 1, the memory controller 104 sets K and M to be values greater than 2. Moreover, the memory controller 104 may also set K and M to be the same, so that the communication file and the corresponding FDB respectively have a same shift amount (i.e. the shift amounts of K and M, and K and M are the same) from the cluster 600(2) and the directory entry field 804(1). In this way, after the host system 1000 formats the memory storage apparatus 100 and before rereading the root directory area 906, when data is written into the memory storage apparatus 100, the communication file and the FDB corresponding to the communication file are not overwritten.

Moreover, in another exemplary embodiment, the memory controller 104 does not establish the communication file and the FDB corresponding to the communication file temporarily after the memory storage apparatus 100 is formatted. Then, when the host system 1000 reads the root directory area 906, the memory controller 104 establishes the communication file and records the FDB of the communication file in a free directory entry field of the root directory area 906. In detail, after the memory storage apparatus 100 is formatted, when the memory storage apparatus 100 receives a read command from the host system 1000, the memory management circuit 202 of the memory controller 104 determines whether a read address indicated by the read command belongs to a logical address of the root directory area 906. If the read address belongs to the logical address of the root directory area 906, the memory management circuit 202 selects a free directory entry field from the directory entry fields and records the FDB corresponding to the communication file in the free directory entry field. For example, the memory management circuit 202 checks the free field 806 of each of the directory entry fields, and when it is found that a value of the free field 806 of one directory entry field is "0", the memory management circuit 202 records the FDB corresponding to the communication file in the free directory entry field. Finally, the memory management circuit 202 transmits data in the directory entry fields of the root directory area 906 to the host system 1000 to respond the read command. In this way, after the host system 1000 reads information in the directory entry field of the root directory area 906, it can identify a storage position of the communication file and other information of the communication file (for example, a file name, an extension name of the file and a file size, etc.).

In the present exemplary embodiment, the memory management circuit 202 transmits the logical address storing the communication file to the application program 1120. Then, the application program 1120 uses the logical address to send command to the smart card chip 108. In detail, the application program 1120 generates a data stream according to the command to be sent, and transmits the write command that indicates writing the data stream to the logical address (i.e. the logical address corresponding to the $K^{th}$ cluster) used for storing the communication file to the memory storage apparatus 100. When the memory storage apparatus 100 receives the write command and the corresponding data stream, the memory management circuit 202 of the memory controller 104 determines whether a write address indicated by the write command is the logical address corresponding to the $K^{th}$ cluster. If the write address is the logical address corresponding to the $K^{th}$ cluster, the memory controller 104 identifies the received data stream to be a command data unit of the smart card chip 108 and transmits the received data stream to the smart card chip 108.

Figure 11:
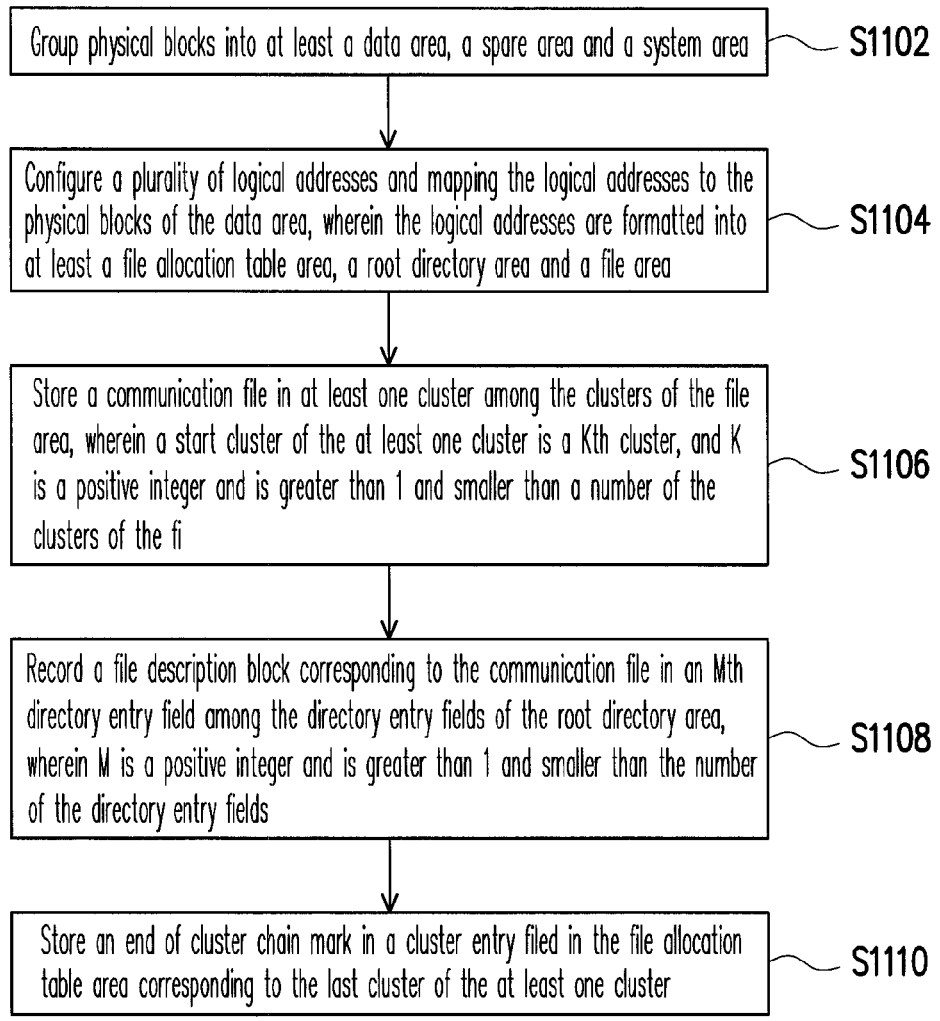
FIG. 11 is a flowchart of a data processing method according to an exemplary embodiment of the present invention.

FIG. 11 is a flowchart of a data processing method according to an exemplary embodiment of the present invention.

Referring to FIG. 11, in step S1102, the memory controller 104 groups the physical blocks into at least a data area, a spare area and a system area. In step S1104, the memory controller 104 configures a plurality of logical addresses and maps the logical addresses to the physical blocks of the data area, wherein the logical addresses are formatted into an FAT area, a root directory area and a file area.

Then, in step S1106, the memory controller 104 stores a communication file in at least one cluster among the clusters of the file area, wherein a start cluster of the at least one cluster is a $K^{th}$ cluster, and K is a positive integer and is greater than 1 and smaller than a number of the clusters of the file area.

Then, in step S1108, the memory controller 104 records an FDB corresponding to the communication file in an $M^{th}$ directory entry field in the directory entry fields of the root directory area, wherein M is a positive integer and is greater than 1 and smaller than the number of the directory entry fields.

Finally, in step S1110, the memory controller 104 stores an EOC mark in a cluster entry field in the file allocation table area corresponding to the last cluster of the clusters wherein the communication file stores. Operation methods of the steps of FIG. 11 have been described in detail above, which are not repeated therein.

In summary, in the memory storage apparatus, the memory controller and the data processing method of the exemplary embodiments of the invention, after the memory storage apparatus is formatted, the communication file is stored from the $K^{th}$ cluster of the file area, and the FDB corresponding to the communication file is recorded in the $M^{th}$ directory entry field of the root directory area, wherein K and M are greater than 1. In this way, after the host system formats the memory storage apparatus and before it rereads the information of the file system, overwriting of the communication file and the FDB corresponding to the communication file can be effectively avoided. The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data processing method, for a memory storage apparatus having a rewritable non-volatile memory module and a smart card chip, wherein the rewritable non-volatile memory module has a plurality of physical blocks, the data processing method comprising:

grouping the physical blocks into at least a data area, a spare area and a system area;

configuring a plurality of logical addresses and mapping the logical addresses to the physical blocks of the data area, wherein the logical addresses are formatted into at least a file allocation table area, a root directory area and a file area, and the file allocation table area has a plurality of cluster entry fields, the root directory area has a plurality of directory entry fields, and the file area has a plurality of clusters;

storing a communication file in at least one cluster among the clusters of the file area, wherein a start cluster of the at least one cluster is a $K^{th}$ cluster, and K is a positive integer and smaller than the number of the clusters of the file area;

recording a file description block corresponding to the communication file in an $M^{th}$ directory entry field among the directory entry fields of the root directory area, wherein M is a positive integer and smaller than the number of the directory entry fields; and storing an end of cluster chain mark in a cluster entry field corresponding to a last cluster of the at least one cluster among the cluster entry fields of the file allocation table area, wherein the step of recording the file description block corresponding to the communication file in the $M^{th}$ directory entry field among the directory entry fields of the root directory area comprises:

receiving a read command from a host system;

determining whether a read address indicated by the read command is a logical address corresponding to the root directory area among the logical addresses;

selecting a free directory entry field from the directory entry fields when the read address is the logical address corresponding to the root directory area, wherein the free directory entry field is not used;

recording the file description block corresponding to the communication file in the free directory entry field; and transmitting data in the directory entry fields of the root directory area to the host system in response to the read command.

2. The data processing method as claimed in claim 1, wherein the step of storing the communication file in the at least one cluster among the clusters of the file area comprises:

storing the communication file in a last cluster of the clusters of the file area.

3. The data processing method as claimed in claim 1, wherein M is equal to 2.

4. The data processing method as claimed in claim 1, wherein M is equal to K.

5. The data processing method as claimed in claim 1, further comprising:

receiving a write command and a data stream corresponding to the write command from the host system;

determining whether a write address indicated by the write command is a logical address corresponding to the at least one cluster among the logical addresses; and transmitting the data stream to the smart card chip when the write address indicated by the write command is the logical address corresponding to the at least one cluster.

6. A memory controller for a memory storage apparatus having a rewritable non-volatile memory module and a smart card chip, the memory controller comprising:

a host interface, configured to couple to a host system;

a memory interface, configured to couple to the rewritable non-volatile memory module, wherein the rewritable non-volatile memory module has a plurality of physical blocks; and a memory management circuit, coupled to the host interface and the memory interface, and grouping the physical blocks into at least a data area, a spare area and a system area, wherein the memory management circuit configures a plurality of logical addresses and maps the logical addresses to the physical blocks of the data area, wherein the logical addresses are formatted into at least a file allocation table area, a root directory area and a file area by the host system, and the file allocation table area has a plurality of cluster entry fields, the root directory area has a plurality of directory entry fields, and the file area has a plurality of clusters, wherein the memory management circuit stores a communication file in at least one cluster among the clusters of the file area, wherein a start cluster of the at least one cluster is a $K^{th}$ cluster, and K is a positive integer and smaller than the number of the clusters of the file area, wherein the memory management circuit records a file description block (FDB) corresponding to the communication file in an $M^{th}$ directory entry field among the directory entry fields of the root directory area, wherein M is a positive integer and smaller than the number of the directory entry fields, wherein the memory management circuit stores an end of cluster chain mark in a cluster entry field corresponding to a last cluster of the at least one cluster among the cluster entry fields of the file allocation table area, wherein the memory management circuit receives a read command from the host system, and determines whether a read address indicated by the read command is a logical address corresponding to the root directory area among the logical addresses, when the read address is the logical address corresponding to the root directory area, the memory management circuit selects a free directory entry field that is not used from the directory entry fields, and records the file description block corresponding to the communication file in the free directory entry field, wherein the memory management circuit transmits data in the directory entry fields of the root directory area to the host system in response to the read command.

7. The memory controller as claimed in claim 6, wherein the memory management circuit stores the communication file in a last cluster of the clusters of the file area.

8. The memory controller as claimed in claim 6, wherein M is equal to 2.

9. The memory controller as claimed in claim 6, wherein M is equal to K.

10. The memory controller as claimed in claim 6, wherein the memory management circuit receives a write command and a data stream corresponding to the write command from the host system, and determines whether a write address indicated by the write command is a logical address corresponding to the at least one cluster among the logical addresses, when the write address indicated by the write command is the logical address corresponding to the at least one cluster, the memory management circuit transmits the data stream to the smart card chip.

11. A memory storage apparatus, comprising:

a connector, configured to couple to a host system;

a rewritable non-volatile memory module, having a plurality of physical blocks;

a smart card chip; and a memory controller, coupled to the connector, the rewritable non-volatile memory module and the smart card chip, and grouping the physical blocks into at least a data area, a spare area and a system area, wherein the memory controller configures a plurality of logical addresses and maps the logical addresses to the physical blocks of the data area, wherein the logical addresses are formatted into a file allocation table area, a root directory area and a file area by the host system, and the file allocation table area has a plurality of cluster entry fields, the root directory area has a plurality of directory entry fields, and the file area has a plurality of clusters, wherein the memory controller stores a communication file in at least one cluster among the clusters of the file area, wherein a start cluster of the at least one cluster is a $K^{th}$ cluster, and K is a positive integer and smaller than the number of the clusters of the file area, wherein the memory controller records a file description block corresponding to the communication file in an $M^{th}$ directory entry field among the directory entry fields of the root directory area, wherein M is a positive integer and smaller than the number of the directory entry fields, wherein the memory controller stores an end of cluster chain mark in a cluster entry field corresponding to a last cluster of the at least one cluster among the cluster entry fields of the file allocation table area, wherein the memory controller receives a read command from the host system, and determines whether a read address indicated by the read command is a logical address corresponding to the root directory area among the logical addresses, when the read address is the logical address corresponding to the root directory area, the memory controller selects a free directory entry field that is not used from the directory entry fields, and records the file description block corresponding to the communication file in the free directory entry field, wherein the memory controller transmits data in the directory entry fields of the root directory area to the host system in response to the read command.

12. The memory storage apparatus as claimed in claim 11, wherein the memory controller stores the communication file in a last cluster of the clusters of the file area.

13. The memory storage apparatus as claimed in claim 11, wherein M is equal to 2.

14. The memory storage apparatus as claimed in claim 11, wherein M is equal to K.

15. The memory storage apparatus as claimed in claim 11, wherein the memory controller receives a write command and a data stream corresponding to the write command from the host system, and determines whether a write address indicated by the write command is a logical address corresponding to the at least one cluster among the logical addresses, when the write address indicated by the write command is the logical address corresponding to the at least one cluster, the memory controller transmits the data stream to the smart card chip.

* * * * *